United States Patent Office 3,006,595
Patented Oct. 31, 1961

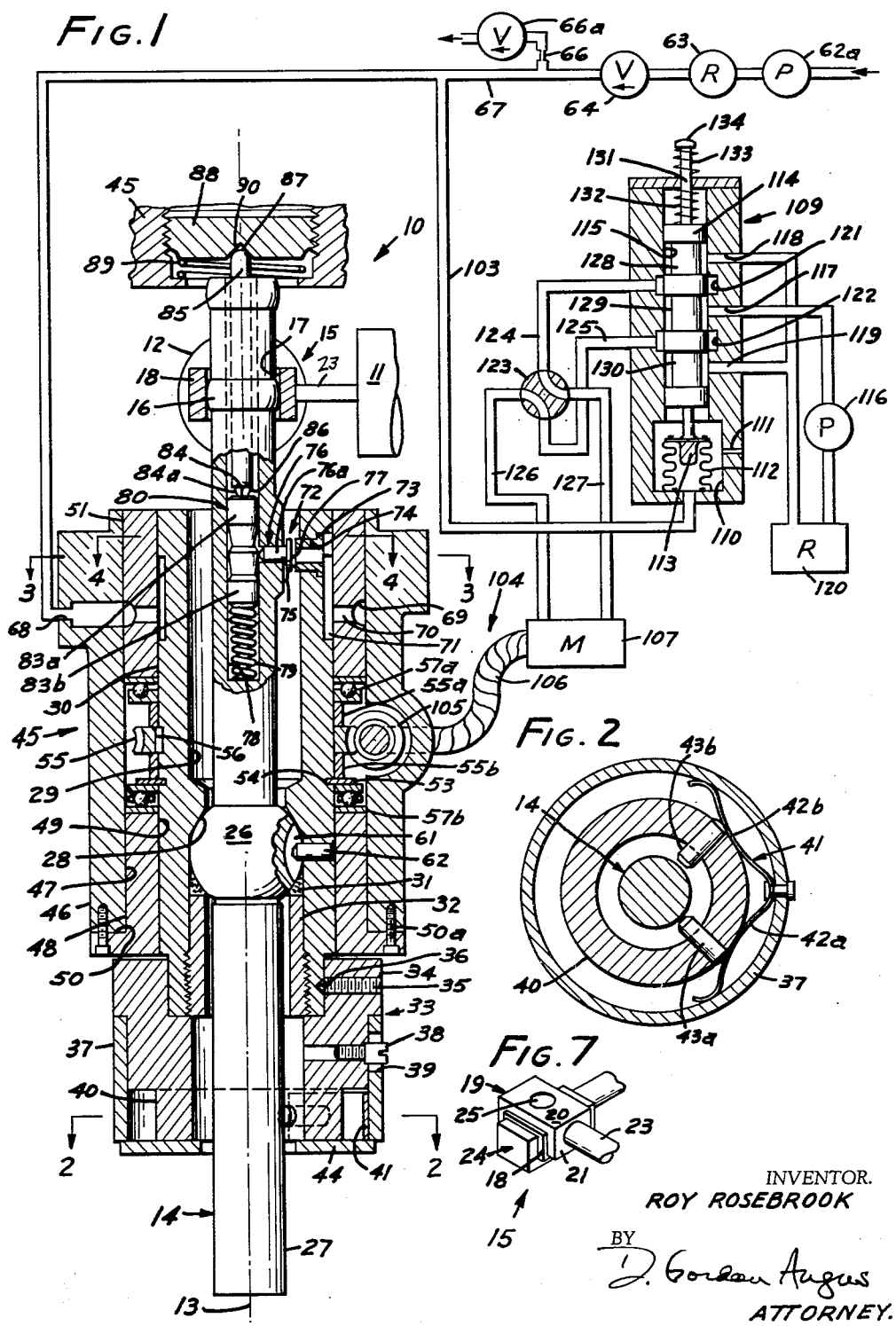

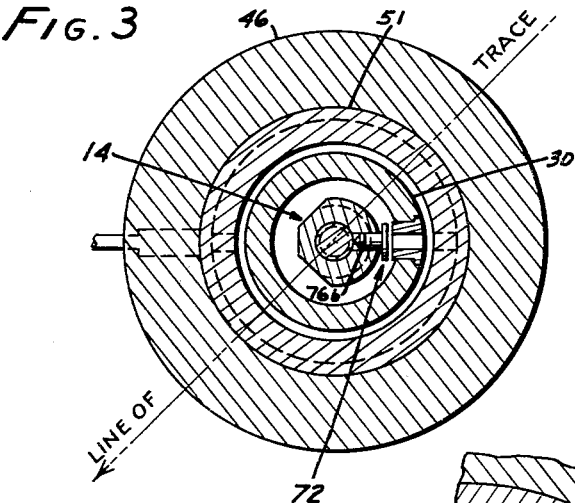
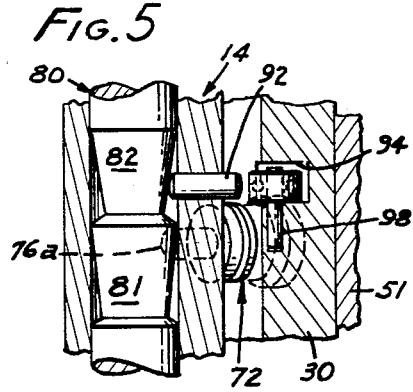
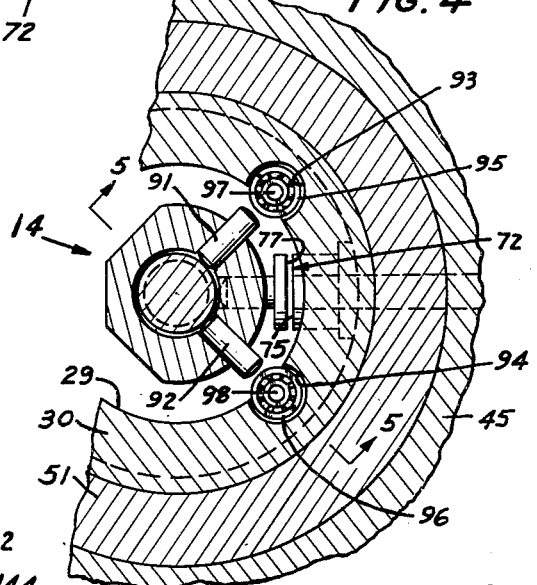
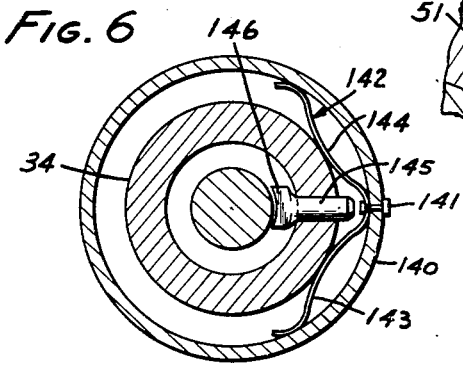
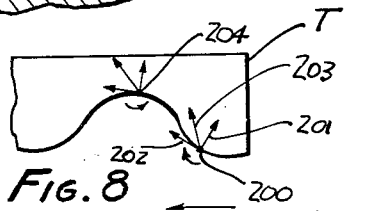

3,006,595
TRACER MECHANISMS
Roy Rosebrook, Los Angeles, Calif., assignor, by mesne assignments, to Banstrom Industries, Inc., Los Angeles, Calif., a corporation of Connecticut
Filed Apr. 21, 1958, Ser. No. 729,948
7 Claims. (Cl. 251—3)

This invention relates to a machine tool control of the type which is commonly known as a tracer valve. Such valves are characteristically used as controls for machine tools in which a workpiece and a cutting tool are shifted relative to each other for the purpose of duplicating in the workpiece the shape of a template or a pattern.

Tracers of this general type are shown in United States Patent 2,753,145 issued to Roy Rosebrook July 3, 1956, and in applicant's co-pending patent application Serial No. 617,374 filed October 22, 1956 and entitled, Automatic Tracer Control, now U.S. Patent No. 2,909,357 issued October 20, 1959.

The above patent and patent application may be consulted for more complete information regarding details of tracer valve construction and operation, these details not being part of this invention.

The actuating control of this type of tracer valve is a stylus which is moved along the contour of a template or pattern which is to be duplicated. In operation, a bias force is exerted on the tip of the stylus so as to deflect or tilt it toward the template. This action adjusts the position of valve means within the tracer valve which regulate the flow of pressurized fluid to power means such as hydraulic motors which relatively shift the workpiece and the cutting tool. The resulting shifting movement of the machine tool elements stops when the stylus is restored to a neutral position by virtue of its contact with the template. The template which has the contour desired to be reproduced in the workpiece, is therefore the ultimate limiter of the machine tool movements. The operation of the device, after the stylus is brought into contact with the template, comprises holding the stylus against the contour being traced, and deflecting the stylus tip laterally with respect to the normal at the tangent point, so that the stylus tip is moved along the surface of the contour, in contact therewith. It is not possible for the cutting tool to cut too far into the workpiece, because the template opposes the bias force when the stylus contacts the template, and tends to restore the stylus and the valves controlled by the stylus to a neutral position relative to the normal line, thereby preventing any deeper cutting into the workpiece.

From the above brief description of the operation of a tracer valve of this type, it will be appreciated that the operation of a contour duplicating machine which utilizes this control resolves itself into the problem of holding the stylus in contact with the template edge, and simultaneously displacing the stylus along the template edge.

In previously known tracer valves, once the set up of the machine was accomplished the operator's whole function was simply to manually deflect the stylus so that it would trace the contour of the template. This stylus deflection calls for little or no skill after the machine is properly set up, and an automatic system which can properly displace the stylus in response to signals can save expensive labor costs and also relieve skilled machinists of the boresome and repetitious task of tracing a stylus tip time and time again around the same template or pattern.

A tracer valve for the above purpose is shown in the above-identified application, Serial No. 617,374, and the elements of the instant tracer valve are generally similar to those disclosed therein. However, despite the fact that the tracer valve described in said application operates well, several difficulties have occasionally arisen which call for improvement. One of these difficulties resides in the control of the rate at which the tool moves along the workpiece. In the device shown in the aforesaid application, the rate control was a ring shaped device in which the maximum stylus deflection was the same regardless of the direction of deflection. This had the disadvantage that when the stylus was fully deflected in the X axis, for example, then the stylus was unable to open the spool valve in the Y axis. Therefore while moving along the template in the X axis at a maximum rate, trouble was occasionally encountered when coming to a sharp change of direction on the template, because quick retraction in the Y axis was not possible without diminishing the rate in the X axis. Also when the rate of movement along the X axis was held to a low rate by the rate control it was impossible to open the Y axis valve wider to provide for a more rapid Y axis movement. It is desirable for the tool to be movable quickly in and out from the workpiece while operating at some maximum traverse speed, even though the maximum rate of traverse is held low and the stylus is operated at maximum deflection for the low rate. The ring-type rate control did not permit simultaneous movement at a high rate in both axes.

Another difficulty has occasionally arisen in the automatic control circuit because of a relative inflexibility in the adjustment provisions of one of the orifices in the control system.

Accordingly it is an object of this invention to provide a rate control for an automatic tracer valve of the above type in which the controlling spool valves on the tracer valve can be opened so as to permit full rate movement along either axis, even when the stylus is displaced to its maximum allowable extent along one or both of said axes. The deflectability along one axis is thereby no longer restrained by the actual deflection in another axis.

An additional object is to provide an improved control orifice for use in a tracer valve of this class.

A preferred but optional feature of this invention resides in providing in a tracer valve which includes a housing and a pivotally mounted stylus within said housing, a pair of pins disposed substantially perpendicular to each other and to the stylus. These pins are located within the housing, and preferably project from the stylus. They limit the maximum tilt of the stylus in the axis in which they lie, and limit the maximum tilt of the stylus in that axis only.

According to another preferred but optional feature of this invention, means are provided for varying the amount of projection of the pins from the stylus as a function of the amount of tilt of the stylus.

According to still another preferred but optional feature of this invention a variable orifice for use in the control system of this invention comprises a nozzle which is attached to the housing, and an opposed anvil opposite said nozzle. The anvil is slidably mounted in the stylus so as to be transversely reciprocable relative thereto. Within the stylus there is provided an axially adjustable rod having a taper thereon, which taper is in contact with the said anvil. The axial position of the rod determines the transverse position of the anvil relative to the stylus. The axial position of the rod is a function of the amount of tilt of the stylus, and also of the adjusted position of the rod. The orifice is thereby compensated as a function of rod adjustment and stylus tilt.

The above and other features of this invention will be fully understood from the following detailed description and the accompanying drawings, in which:

FIG. 1 is a side elevation partly in cross-section and partly in schematic notation, showing an automatic tracer valve incorporating this invention;

FIGS. 2, 3 and 4 are cross-sections taken at lines 2—2, 3—3 and 4—4, respectively, of FIG. 1;

FIG. 5 is a magnified fragmentary elevation, partly in cross-section, showing details of the valve of FIG. 5;

FIG. 6 is a cross-section showing an alternative construction for certain parts of FIG. 2;

FIG. 7 is an isometric view of a means for spool valves and means for mounting the same to the stylus in FIG. 1; and FIG. 8 is a schematic drawing showing the operation of the device.

A machine tool control according to this invention utilizes a tracer valve 10 as its primary control means. Tracer valve 10 has an X-axis spool valve 11 and a Y-axis spool valve 12. These spool valves are mounted with their axes perpendicular to the longitudinal axis 13 of a tracer stylus 14. The stylus is pivotable around a ball-like member 26. It is to be understood that exact perpendicularity of both spool valve axes to the axis of the stylus occurs only when the stylus is in its central (or neutral) position as shown in FIG. 1. However, the angular deflection of the stylus from its central position around ball-like member 26, even for maximum deflection, is usually less than 14′ of arc, so that any variation from strict perpendicularity of the three axes is negligible. The details of construction of the spool valves form no part of this invention. Such details may be obtained from the aforesaid United States Patent No. 2,753,145.

The spool valves are operationally connected to the stylus by means of a yoke assembly 15 which is also fully disclosed in said patent. As briefly shown in FIG. 7, yoke assembly 15 is mounted to a ball-like member 16 that is incorporated in the stylus. The stylus passes through a hole 17 in a rectangular prismatic block 18 so that the ball-like member 16 is disposed within said hole, where it makes a firm contact with the wall thereof. A U-shaped member 19 has a bight 20 and two legs 21. Leg 21 is attached by means of rod 23 to X-axis spool valve 11 so that deflection of the stylus in a direction having a component in the X-axis causes the ball-like member 16 to move the block 18 and U-shaped member 19, and thereby shift the spool of the X-axis by a distance proportional to the X-axis component of the movement of the stylus tip.

This movement regulates the rate and direction of flow through said valve by adjusting its openings. The regulated flow is directed to power means for actuating the machine tool in the direction of the X-axis. These power means are not shown inasmuch as they are no part of the invention, but they are ordinarily hydraulic motors such as a piston and cylinder assembly.

Another U-shaped member 24 has a similar bight and pair of legs, and similar means for attachment to the Y-axis spool valve 12. Bights of the U-shaped members are crossed relative to each other, and they and the legs are placed at opposite sides of the block from each other so that they enclose the block between them. The stylus passes through the holes 25 in the bights of the U-shaped members. Deflection of the stylus tip in a direction (by pivotal movement around ball-like member 26) having a component along the Y-axis will shift the spool of the Y-axis spool valve by an amount proportional to the Y-axis component, thereby regulating the rate and direction of flow therethrough by adjusting its openings. The regulated flow is directed to a power means for actuating the machine tool in the direction of the Y-axis.

Ball-like member 26 is preferably, although not necessarily, incorporated in the stylus at an intermediate position between the ends of said stylus. It serves as a fulcrum, so that when the bottom or tip portion 27 of the stylus is deflected through some angle, then the portion of the stylus on the opposite side of the ball-like member 26, moves through an equal and opposite angle so as to move the X and Y-axis spool valves by distances which are proportional to the component of motion of the stylus tip along the respective axes.

The ball-like member 26 is mounted by providing a ball seat 28 on the inside wall of a stylus passage 29. The stylus passage is formed in a rotatable sleeve 30. The sleeve is counterbored at its lower end to receive a seat insert 31 which supports the ball-like member 26 against the ball seat 28. A hollow plug 32 is threaded into the counterbore to hold the seat insert in place. The ball-like member is mounted between seat 28 and seat insert 31.

Bias means 33 are attached to the lower end of the rotatable sleeve. The bias means comprise a collar 34 which is held to the rotatable sleeve 30 by a set screw 35 which is seated in a detent groove 36 in the outside surface of the sleeve. The set screw holds the collar rigidly to the sleeve so that the collar rotates with but not relative to the sleeve 30.

A ring 37 fits around the lower part of the collar and can be rotated relative to the collar. A bolt 38 projects from the collar through a slot 39 in the ring. The slot extends part way around the periphery of the ring so that the total angular distance through which the ring can be turned relative to the collar is limited by the bolt.

The collar is provided with a step 40 which leaves a space between the ring and the collar within which a spring 41 (see FIG. 2) is held by a rivet or other means. This spring has two undulations 42a, 42b. Two pins 43a, 43b project through the wall of the collar and are radially reciprocable therethrough so that either of the pins can be forced into contact with the stylus by the spring when the spring is positioned with one of the undulations in contact with said pin. An annular plate 44 is attached to the bottom end of the collar to hold ring 37 in place.

The housing 45 of the tracer valve has a depending neck 46 with an opening 47 at the bottom thereof. Opening 47 is partially closed by plug 48, which plug contains part of a sleeve bore 49. This plug is inserted into the opening and has a shoulder 50 which bears against the bottom of the depending neck to which it is held by screws 50a. A cylinder 51 is pressed into the upper end of opening 47. The bore through cylinder 51 is co-axial with and of the same diameter as that of the opening in the plug 48, and forms part of the sleeve bore.

The sleeve 30 is rotatably mounted within the sleeve bore 49 in the following manner. A snap ring 53 is seated in a groove 54 in the outer surface of the rotatable sleeve 30, at a location along the length of said sleeve between the plug 48 and cylinder 51. A ring gear 55 surrounds the sleeve. A key 56 constrains the ring gear to rotation with the rotatable sleeve. Two floating inserts 55a, 55b space the gear from a pair of ball-bearings 57a, 57b.

So that the stylus will rotate around its own axis along with the rotatable sleeve 30, a key slot 61 is formed in the ball-like member 26, said slot being aligned with the longitudinal axis 13 of the stylus. A round pin 62 is seated in the rotatable sleeve 30, and projects into the key slot toward the center of the ball-like member 26. It will be appreciated that the stylus can be universally deflected in any direction, but that it cannot be rotated about its own axis independently of the rotatable sleeve 30.

Sensing means are provided for sensing the spacing between the rotatable sleeve 30 (or more generally, the wall of the stylus passage 29) and the stylus. This sensing means includes a circuit adapted to receive a supply of pressurized air from a source such as a pump 62a by which air is supplied to a pressure regulator 63. A restrictor valve 64 receives air at an adjusted pressure from the pressure regulator, and supplies it to a signal conduit 67. Signal conduit 67 is tapped by a fixed orifice 66. The opening of the fixed orifice may conveniently be made adjustable for different set-ups by providing a valve 66a for the purpose. The term "fixed orifice" refers to the maintenance of orifice 66 at a given capacity for a particular set-up, the capacity thereof not changing with the conditions in the machine tool during a given operation. Fixed orifice 66 provides a reference bleed to atmosphere from signal conduit 67. While the fixed orifice is often desirable, valve 66a can be closed in the event that it is not desired for some particular set-up. It is occasionally found that a fixed orifice is not desirable or necessary.

Signal conduit 67 further interconnects to a port 68 in the tracer valve housing 46. This port 68 leads to a circumferential groove 69 in the outer surface of cylinder 51. A passage 70 interconnects groove 69 with a circumferential groove 71 in the outside surface of sleeve 30. Groove 71 connects to a variable orifice 72. Variable orifice 72 is partly formed by a nozzle 73 set in a passage 74 so that its opening discharges into the stylus passage 29. The end of the nozzle is a flat planar annular surface 75. This surface 75 is parallel to the longitudinal axis of the stylus when the stylus is in its neutral position as shown in FIG. 1. Another portion of the variable orifice comprises an orifice block or anvil 76 which has a flat round orifice face 77 thereon, which orifice face is parallel to the longitudinal axis of the stylus. The anvil has a shank 76a which is reciprocably slidable in a passage 76b in the stylus. The surface 75 and face 77 are parallel when the stylus is in its neutral position, and the spacing between said surface and face is varied by tilting the stylus.

For purposes of definition the variable orifice 72 will be considered as comprising the nozzle 73, surface 75 and face 77.

Adjustment means are provided for adjusting and compensating the spacing between the surface 75 and orifice face 77. A bore 78 is drilled downward from the top of the stylus along the axis thereof. A compression spring 79 is seated in the bottom of said bore. A rod 80 has two tapers, which are preferably tapered, frusto-conical circumferential surfaces, an orifice-adjustment surface 81 with an included conical angle of about 20°, and a rate adjustment surface 82 with an included conical angle of about 12°. On opposite sides of these two frusto-conical surfaces are guide surfaces 83a, 83b which keep the rod axially aligned in the bore. The top of the rod has a sink 84 therein which holds a ball 84a. A pin 85 has a sink 86 therein which rests on the ball so that the ball is held between the pin and the rod. The pin has a rounded upper end 87. The pin has a lesser diameter than the bore in the stylus so that the pin can tilt therein.

The distance which the anvil is thrust out from the side of the stylus is determined by the axial position of the rod, which in turn is partly determined by how far down the pin presses the rod. The adjustment of the pin is secured by means of an adjustment screw 88 which is threaded through the top of the housing 45. An anti-backlash spring 89 is fitted between the adjustment screw and the housing. The adjustment screw is provided with a hemispherical sink 90 which receives the rounded end 87 of pin 85.

The rod also forms a part of means for adjusting the maximum rate of travel of the machine tool. It will be appreciated that the greater the deflection of the stylus, the greater will be the opening of the spool valves and therefore the greater will be the rate of pressurized fluid which is passed by the valve, which rate of fluid flow determines the rate of travel of the machine tool elements. Means which restrict the maximum deflection of the stylus therefore also serve to restrict the maximum traverse rate of the machine tool elements, in direct proportion. For this purpose, and as best shown in FIGS. 4 and 5, two rate control pins 91, 92 pass through transverse holes in the stylus so that they bear against the rate-adjustment surface 82. The rate control pins project beyond the stylus by a distance which is determined by the axial location of the rate adjustment surface. The farther down the control surface is, the less clearance there will be between the pin and the wall of the stylus passage, and the less stylus deflection is permitted in that direction. Also, the higher the rod is in the stylus, the more play is allowed to the rate-control pins and the greater is the permissible stylus deflection. Therefore, the maximum rate of movement of the machine tool elements is lessened by forcing the rod 80 downward and is increased by easing off the pin 85 and permitting the spring to raise the rod.

In recesses 93, 94 disposed in the wall of the sleeve, there are provided ball bearings 95, 96. The ball bearings are mounted to stakes 97, 98 sunk in the recesses. The ball bearings are substantially in line with the rate control pins.

Shank 76a bears against orifice-adjustment surface 81. The separation between surface 75 and face 77 is adjustable by moving the rod up and down.

The signal conduit 67 (and thus the sensing means) is connected by conduit 103 to reversible means 104 for turning the rotatable sleeve 30. This conduit branches off from conduit 67 at a location between the fixed orifice 66 and the variable orifice 72, thereby conveying the pressure from the sensing system as determined by the two orifices (or by the variable orifice alone if the fixed orifice is not used) to pilot means.

A worm gear 105 is journaled in the housing and meshes with the ring gear 55. The worm gear is driven by flexible shaft 106, which shaft is in turn driven in either direction by a motor 107 which may, for example, be a hydraulic motor.

The operation of the motor is governed by pilot means. These pilot means comprise a selector valve 109 whose adjustment is determined by the pressure in conduit 103. The sensing means are thereby operatively connected to reversible means for the purpose of turning the sleeve 30, the reversible means including the pilot means, the motor, the flexible shaft, and the worm and ring gears.

The selector valve has bellows chamber 110 which is vented to atmosphere by port 111. Within this bellows chamber there is disposed a flexible bellows 112. Conduit 103 is connected to the inside of the bellows.

Rising pressure in conduit 103 tends to expand the bellows. Diminishing pressure in conduit 103 tends to permit the bellows to contract. In order to keep the gas volume of the sensing means as small as possible, a plug 113 is placed inside the flexible bellows. This plug fills up some of the excess volume of the bellows which otherwise would comprise an additional volume of gas which must change its pressure in order for the selector valve adjustment to be changed. The plug does not change the cross-sectional area of the bellows, which area is needed for providing force for adjusting valve 109. Generally speaking, it is desirable to reduce the volume of the sensing system as much as possible.

The bellows is connected to spool 114 which slides within spool sleeve 115. The spool sleeve receives pressurized hydraulic fluid from a pressure source 116 at a pressure inlet 117. Exhaust outlets 118 and 119 are disposed in the wall of the spool sleeve on opposite sides of the pressure inlet, and are manifolded so as to discharge into reservoir 120.

One member of a pair of motor supply grooves 121, 122, is disposed between each of the exhaust outlets and the pressure inlet. Motor supply groove 121 is connected to one port of a four-way valve 123 by conduit 124. Motor supply groove 122 is connected to another port of the four-way valve by means of conduit 125. Conduits 126 and 127 are connected to the other ports of the valve 123 and to opposite sides of the hydraulic motor 107.

The spool of the selector valve makes a sliding sealing fit within the spool sleeve 115, and has three grooves 128, 129 and 130 therein. The central groove 129 is always in communication with pressure inlet 117, and one or the other of grooves 128 or 130 is always connected to one or the other of exhaust outlets 118 and 119, respectively, depending on the position of the spool in the spool sleeve.

A stem 131 extends upward from the spool 114 through the case of the selector valve. A balance spring 132 is placed between the spool and the case of the selector valve so as to oppose forces exerted by the bellows. A counter-weight spring 133 is placed outside the selector valve case, between a head 134 on the stem 131 and the selector valve case. It counterbalances the weight of the spool.

A modified form of bias means is shown in FIG. 6. These bias means may be used in place of those shown in FIGS. 1 and 2. A ring 140 surrounds the collar 34. A bolt 141 projects through a slot in the collar for limiting the rotation of the ring to a desired arc. A spring 142 is riveted to the ring, and has a pair of undulations 143, 144. A bias pin 145, having a yoke 146 facing the stylus, projects through the wall of the collar. The tip of the bias pin is contacted by an undulation of the spring when the ring is turned in either direction, so that the spring exerts a yieldable bias force on the stylus. To remove the bias force, it is only necessary to turn the ring to the position shown in FIG. 6, wherein the spring does not contact the bias pin.

The operation of the machine tool control shown in FIG. 1 will now be described. It will be assumed that the cutter and the workpiece to be shaped are set up in the same relationship to each other as the protruding tip portion of the stylus is to the template or pattern to be traced. Customarily, the tracer valve and the cutting tool are mounted so as to move with each other, and the template and workpiece are mounted to a common base so that they move together. Therefore, once the machine tool is properly set up, any movement between the template and the tracer valve is duplicated between the cutter and the workpiece. It is the function of the stylus tip to be movable toward and along the template so as to adjust the spool valves in the tracer valve. The spool valves in turn pass power to motive means for moving the machine tool elements in order to shift the tracer valve and cutting tool relative to the template and the workpiece, respectively.

The template acts as a limiting means which causes the spool valves to go into a neutral position when the tracer valve (and therefore the cutting tool) is located at the correct position. This is for the reason that when the stylus is deflected toward the template, the resulting movement of the machine tool elements will be such as to bring the stylus tip and the template together, and this movement will continue until the longitudinal axis of the stylus is perpendicular. At that condition, the spool valves are in neutral position with respect to further movement against the template. If such movement did continue, the template would push the stylus into an over-center position, thereby reversing the valves and moving the stylus away from the template. This reverse movement also tends to stop at the neutral position. The aforesaid Patent No. 2,753,145 may be referred to for a more detailed description of the operation of this type of tracer valve, particularly with respect to the flow of hydraulic fluid through the spool valves when the stylus is deflected.

The usual means of operating machine tool control of the type shown in the aforesaid patent is to displace the stylus tip toward the template by hand. When the tip initially strikes the template, the stylus is still slightly deflected. Further movement of the valve toward the template in response to this deflection lessens the deflection until the template restores the stylus to a neutral position. This is as far as the tracer valve will approach the template at the point of contact, because any such further movement would displace the stylus tip which would reverse the direction of machine tool movement, and therefore would back the tracer valve and the cutting tool away from the template and workpiece respectively. Therefore a null position results at the correct adjustment of the cutting tool and workpiece. It will be appreciated from the above statements that the depth of a cut in a direction which is normal to the surface of a template at any given point of tangency is determined by restoring the stylus to a position in a plane which is perpendicular to said normal line at the point of contact.

It will also be understood that even when the stylus lies in such a plane it can still be deflected so as to cause lateral movement along the template. Lateral deflection causes the tracer valve to trace along the edge of the template or pattern.

The operation of this valve is therefore resolved into the actions of holding the stylus tip against the surface of the template or pattern, and simultaneously displacing the tip laterally, along the edge thereof. The way this is done in the instant invention is by exerting a force on the stylus tip which is oblique to the normal to the template at the point of contact between the stylus and the template. This creates a force component which is normal to the template and holds the stylus tip against the template edge, and also creates a lateral component which tends to displace the stylus along the surface of the template. The stylus will thereupon trace along the template and stay in contact therewith.

The set up of the tool of FIG. 1 is accomplished as follows: With the stylus in its neutral (central) position, the pressure is adjusted in signal conduit 67 so that selector valve 109 is in its neutral position. It will be noted that there is an inter-relationship between the initial pressure in the signal conduit 67 and the adjustment of the rate control pins, because the two adjustment surfaces 81 and 82 are formed on the same rod. As it happens, this is not disadvantageous, because with the conical angles shown, it has been determined that the parameters of the system are quite satisfactory using one rod. If desired of course the two surfaces could have been installed on separate rods arranged concentrically to each other or otherwise so that they could be adjusted independently of each other.

With the bias force removed from the stylus, and the stylus in its neutral position, there is no tendency for the control to shift any part of the machine tool which it controls.

In order to start the tracer valve in operation, the ring 39 is turned one way or the other so that the appropriate one of the pins is pressed by an undulation of spring 41. This causes the pin to bear against the stylus and move the stylus tip toward the template. If the bias is not initially in the correct direction, the stylus could either be deflected manually by temporarily overpowering the bias means, or in the device of FIG. 2, the other of the bias pins might be put under compression. When the stylus makes contact with template as shown in FIG. 8, the template attempts to restore the stylus to a neutral position. However, the bias means, being disposed at an angle to the normal of the point of contact between the template and the stylus, tends to deflect the stylus laterally along the template while still holding the stylus in contact therewith.

Assuming for a moment that the template recedes away from the stylus, as shown at the right hand side of FIG. 8, then the bias pin will deflect the stylus so as to move the anvil surface 77 toward the nozzle surface 75, thereby increasing the resistance to leakage of air out of the variable orifice. This raises the pressure in signal conduit 67 and in bellows 112, thereby shifting the spool 114 upward.

The upward movement of the spool connects pressure groove 117 with the motor supply conduit 124, which passes pressurized fluid to hydraulic motor 107. Motor 107 turns the worm gear 105 to rotate the sleeve, and with it the bias means. This rotation is clockwise in FIG. 8.

FIG. 8 illustrates the need for rotation in the clockwise direction when the template recedes. Point 200 is the point of contact between stylus 14 and the profile of a template T at a position where the template profile is curving (sometimes called sloping) away from the traverse direction. Line 201 is a normal to the template at point 200, and line 202 is a line perpendicular to the normal; that is, line 202 is lateral or tangent to the template profile at point 200. In order for the stylus to remain in contact with the profile and still trace around it, the bias force (shown at point of contact for convenience of disclosure) is exerted along line 203. This gives a normal component along line 201 and a lateral component along line 202. The normal component maintains contact with the profile, and the lateral component displaces the stylus so that the stylus traces along the profile.

A slope change wherein the template edge approaches the stylus is shown at the left hand side of FIG. 8 (point 204 and points to its left in the fig.). Under these circumstances, the template pushes the stylus against the bias means so as to increase the separation of the inclined surface 75 and the orifice surface 77. The pressure in signal conduit 67 decreases because of the opening of the variable orifices. Bellows 112 starts to collapse, and spool 114 moves downward in FIG. 1. Pressure groove 129 then is in communication with motor supply groove 122, and pressurized hydraulic fluid is supplied to motor 107, through conduits 125 and 126. This causes a counter-clockwise rotation of bias means in FIG. 2 which is opposite in sense from the rotation described above in which situation the template receded from the stylus. The counter-clockwise rotation of the bias means which results when the template approaches the stylus moves the point of application of the bias force to a radial position where the desired normal and lateral components at force are exerted.

There is a unique direction of application of bias force for any angle of the profile relative to a selected axis, such as the X axis, which axis may be called the traverse direction as shown in FIG. 8. Once the mechanism herein has adjusted the direction of the bias to correspond with some given angle which the tangent to the template makes at the point of contact, the bias direction remains unchanged until this angle again changes. Thus there is no further change in bias position whenever the profile is a straight line regardless of what angle the profile makes with the X axis.

A change in bias direction does need to be made when the angle the tangent makes to the X axis changes, and here there are two cases:

(1) Where the template profile curves away from the traverse direction, and (2) Where the template profile curves toward said traverse direction.

In case 1 as illustrated in the right hand portion of FIG. 8, the curvature of the template tends to reduce, or even eliminate, the normal force component. Therefore a clockwise rotation the bias means is called for in order to keep the stylus in contact with the template. In case 2 as shown in the left hand portion of FIG. 8, the curvature of the template tends to reduce, or eliminate, the lateral force component. Therefore, a counter-clockwise rotation of the bias means is called for in order to keep the stylus moving along the template profile. Cases 1 and 2 are discreet conditions, and there is no redundancy or confusion between them. In case 1 signal pressure rises above the null value. In case 2 it falls below the null value. The sense of the bias rotation is thereby uniquely determined. Null conditions are restored when the bias means applies its force at the oblique angle to the normal at point of contact. It will be seen that the above is all that is necessary in order to keep the stylus tracing along the surface of the template. The essence of this technique is to keep the bias means at an angle to the normal at the point of contact with the template. Pin 85 provides for adjusting the variable orifices in FIG. 1 for errors of non-parallelism which may occur when the stylus is tilted. By providing the pin in the manner shown, the frusto-conical surface 81 is raised slightly and the orifice is open a triffle. It has been found that this compensates for the non-parallelism when the anvil approaches the nozzle. A similar compensation results when the tilt is in the other direction.

Rate control pin 91 limits the lateral component by contact with bearing 95. Rate control pin 92 limits the normal component by contact with bearing 96. The separation between the pins and the bearings which determines the maximum tilt of the stylus, is set by the axial position of surface 82. Pin 85 can be initially adjusted to set the spacing, and the spacing is slightly enlarged when the stylus tilts by virtue of the tilting movement of pin 85. It will be observed that each of the pins controls the maximum rate in one or the other of the two components of movement—normal to, or laterally along, the surface of the template.

The bias means shown in FIG. 6 are applied by turning collar 140 in either direction to place a spring undulation in contact with pin 145.

This invention is not to be limited by the embodiments shown in the drawings and described in the description, which are given by way of example and not of limitation, but only in accordance with the scope of the appended claims.

I claim:

1. A control for controlling relative movements of machine tool elements along a pair of mutually perpendicular machine tool coordinate axes under regulation derived from contact with the profile of a pattern, said control comprising: a pair of mutually perpendicular control means; a stylus linked to both of said control means so as to adjust them in response to the angular position of said stylus, the stylus having a longitudinal axis, said control including a housing having an opening from which the stylus projects, and means for angularly biasing the stylus and for limiting the maximum change of adjustment of the control means, said means for biasing and limiting comprising: a sleeve rotatably mounted in said opening, said stylus being mounted in said sleeve so as to be universally deflectible therein, but restrained against rotation around its axis relative to the sleeve, said stylus having an axial bore at one end; a spring seated in said bore; a compensator member seated against the spring and axially slidable in said bore; an adjustment member connected to the housing; a push rod between said adjustment member and said compensator member, the adjustment member adjusting the axial position of the rod and compensator member; a pair of tapers on said compensator member; an anvil comprising a shank and a flat head, said shank passing through said stylus to contact one of said tapers, the flat head being disposed between the stylus and the sleeve; a rate control pin passing through said stylus to contact the other of said tapers, whereby the axial position of said compensator member determines the radial distance which the anvil and the rate control pin project from the stylus; a nozzle in said sleeve in alignment with and in proximity to the anvil and positioned so that fluid discharged by it impinges on the anvil; stop means in said sleeve contactable by said rate control pin; bias means attached to said sleeve for exerting a deflecting force on said stylus; reversible means for rotating said sleeve; a fluid system connected to and discharging through said nozzle whereby the system is responsive to stylus deflection; and power means for controlling said reversible means responsive to pressure in said fluid system as varied by the spacing between said nozzle and anvil.

2. A control for controlling relative movements of machine tool elements along a pair of mutually perpendicular machine tool coordinate axes under regulation derived from contact with the profile of a pattern, said control comprising: a pair of mutually perpendicular control means; a stylus linked to both of said control means so as to adjust them in response to the angular position of said stylus, the stylus having a longitudinal axis, said control including a housing having an opening from which the stylus projects, and means for angularly biasing the stylus and for limiting the maximum change of adjustment of the control means, said means for biasing and limiting comprising: a sleeve rotatably mounted in said opening, means mounting said stylus in said sleeve so as to be universally deflectible therein, but restrained against rotation around its axis against the sleeve, said stylus having an axial bore open at one end, a spring seated in said bore, a compensator member axially slidable in said bore and bearing against said spring; an adjustment member connected to the housing; a push rod in opposition between said adjustment member and said compensator member; a taper on said compensator member; a rate control pin passing through said stylus which contacts the taper at one of its ends, and projects from the stylus at the other of its ends, whereby said adjustment means determines the radial distance which the rate control pin projects from the stylus; stop means in said sleeve contactable by the rate control pin; bias means attached to said sleeve for exerting a force on said stylus, reversible means for rotating said sleeve; a fluid system responsive to stylus deflection; and power means responsive to pressure in said fluid system for controlling said reversible means.

3. Apparatus according to claim 2 in which a pair of said rate control pins are provided, said pins being mutually perpendicular to each other and also perpendicular to the longitudinal axis of the stylus and in which a pair of said stop means are provided, one of said stop means being aligned with each of said rate control pins.

4. Apparatus according to claim 3 in which said stylus mounting means includes a ball-like member having a longitudinal slot in the surface thereof, and in which said sleeve includes a pin projecting into said slot, said sleeve including two seat means for holding the ball-like member between them.

5. A control for controlling relative movements of machine tool elements along a pair of mutually perpendicular machine tool coordinate axes under regulation derived from contact with the profile of a pattern, said control comprising: a pair of mutually perpendicular control means; a stylus linked to both of said control means so as to adjust them in response to the angular position of said stylus, the stylus having a longitudinal axis, said control including a housing having an opening from which the stylus projects, and means for angularly biasing the stylus and for limiting the maximum change of adjustment of the control means, said means for biasing and limiting comprising: a sleeve rotatably mounted in said opening, said stylus being mounted in said sleeve so as to be universally deflectible therein, but restrained against rotation around its axis relative to the said sleeve, said stylus having an axial bore open at one end; a spring seated in said bore, a compensator member axially slidable in said bore and bearing against said spring; an adjustment member connected to the housing; a push rod in opposition between said adjustment member and said compensator member; a taper on said compensator member; an anvil comprising a shank and a flat head, said shank passing through said stylus to contact said taper, the flat head being disposed between the stylus and the sleeve, whereby said adjustment means adjusts the radial distance between the anvil and the stylus, a nozzle in said sleeve in alignment with and in proximity to the anvil and positioned so that fluid discharged by it impinges on the anvil; bias means attached to said sleeve for exerting a tilting force on said stylus; reversible means for rotating said sleeve; a fluid system discharging through said nozzle; and power means for controlling said reversible sleeve responsive to pressure in said fluid system as varied by the spacing between said nozzle and anvil.

6. Apparatus according to claim 5 in which said bias means comprise a collar rotatably mounted to said sleeve, a spring attached to said collar, and a bias pin so disposed and arranged as to be reciprocable in a direction normal to the longitudinal axis of the stylus, said spring being adapted to yieldingly force the pin against the stylus.

7. In a tracer valve for duplicating the profile of a pattern in a workpiece, which valve includes a stylus having a longitudinal axis and which stylus is deflectible to contact the profile of the pattern, means for limiting the maximum lateral deflection of the stylus comprising: a pair of mutually perpendicular pins projecting laterally from said stylus, each of said pins is normal to the stylus and carried by the stylus; stop means in the valve contactable by said pins; a bore in the stylus; a spring seated in the bottom of said bore, a compensator member in said bore and bearing against said spring, a taper on said compensator member contacting the said pins, and means for moving the compensator member axially in the stylus against the force of the spring whereby the axial position of the taper relative to the rate control pins adjusts their lateral projection beyond the stylus.

References Cited in the file of this patent

UNITED STATES PATENTS

| | | |
|---|---|---|
| 1,959,178 | Sassen | May 15, 1934 |
| 2,138,621 | Beehler | Nov. 29, 1938 |
| 2,723,827 | Humes | Nov. 15, 1955 |